United States Patent
Tsao et al.

(10) Patent No.: US 7,837,350 B2
(45) Date of Patent: Nov. 23, 2010

(54) LIGHT EMITTING DIODE ILLUMINATING DEVICE

(75) Inventors: Chih-Chung Tsao, Miao-Li Hsien (TW); Mei-Jiun Lin, Miao-Li Hsien (TW); Hung-Chih Yang, Miao-Li Hsien (TW); Jui-Wen Fang, Miao-Li Hsien (TW); Shu-Hui Hsieh, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 284 days.

(21) Appl. No.: 12/057,720

(22) Filed: Mar. 28, 2008

(65) Prior Publication Data

US 2009/0097248 A1    Apr. 16, 2009

(30) Foreign Application Priority Data

Oct. 16, 2007    (CN)    .................. 2007 1 0202082

(51) Int. Cl.
   *F21V 5/00*    (2006.01)
(52) U.S. Cl. ................... 362/246; 362/617; 362/618
(58) Field of Classification Search .......... 362/600, 362/602, 617, 620
   See application file for complete search history.

(56) References Cited

U.S. PATENT DOCUMENTS

| | | | |
|---|---|---|---|
| 4,274,217 A * | 6/1981 | Ohshima | 40/451 |
| 4,915,479 A * | 4/1990 | Clarke | 349/62 |
| 5,005,108 A * | 4/1991 | Pristash et al. | 362/602 |
| 5,255,171 A * | 10/1993 | Clark | 362/231 |
| 5,899,552 A * | 5/1999 | Yokoyama et al. | 362/619 |
| 6,097,549 A * | 8/2000 | Jenkins et al. | 359/726 |
| 6,272,267 B1 * | 8/2001 | Hansler et al. | 385/43 |
| 6,527,411 B1 * | 3/2003 | Sayers | 362/245 |
| 6,957,901 B2 * | 10/2005 | Schach et al. | 362/489 |
| 2008/0212321 A1 * | 9/2008 | Peng et al. | 362/246 |

FOREIGN PATENT DOCUMENTS

| | | |
|---|---|---|
| CN | 1646947 A | 7/2005 |
| CN | 2895987 Y | 5/2007 |
| JP | 11227247 A | 8/1999 |
| JP | 200621073 A | 8/2006 |

OTHER PUBLICATIONS

Joseph Bielecki et al., "Thermal Considerations for LED Components In An Automotive Lamp", 23rd IEEE Semiconductor Thermal Measurement and Management Symposium, Mar. 2007, pp. 37-43, vol. 18, Issue 22, IEEE.

* cited by examiner

*Primary Examiner*—Ali Alavi
(74) *Attorney, Agent, or Firm*—Andrew C. Cheng

(57) ABSTRACT

A light emitting diode (LED) illumination device (10) includes an LED (11), a frustum-shaped light guide member (12) and a light diffusing plate (13). The frustum-shaped light guide member (12) has a light input surface (120) and a light output surface (122) opposite to the light input surface (120). The light guide member (12) tapers from the light output surface (122) to the light input surface (120). The light input surface (120) is optically coupled to the LED (11), and the light diffusing plate (13) is optically coupled to the light output surface (122) of the light guide member (12).

15 Claims, 5 Drawing Sheets

LIGHT EMITTING DIODE ILLUMINATING DEVICE

BACKGROUND

1. Technical Field

The present invention generally relates to a light emitting diode illumination device.

2. Description of Related Art

Light emitting diode (LED) is a type of solid state light emitting device and is widely used in daily life, such as in illumination devices or non-emissive display devices, due to its high brightness, long life-span, and wide color gamut. Reference is made to an article by Joseph Bielecki, "Thermal Considerations for LED Components in an Automotive Lamp", on Semiconductor Thermal Measurement and Management Symposium, 2007, SEMI-THERM 2007, Twenty Third Annual IEEE, the disclosure of which is incorporated herein by reference.

The LED is relatively small in size with high light intensity and heat flux, which usually results in a strong glare light from the LED. Such glare light is unpleasant to user's eyes.

Therefore, there is a need for a light emitting diode illumination device which can attenuate the light intensity of the LED and has a uniform light emission.

SUMMARY

The present invention provides a light emitting diode illumination device. The light emitting diode illumination device comprises an LED, a frustum-shaped light guide member and a light diffusing plate. The frustum-shaped light guide member has a light input surface and a light output surface opposite to the light input surface. The light guide member tapers from the light output surface to the light input surface. The light input surface is optically coupled to the LED, and the light diffusing plate is optically coupled to the light output surface of the light guide member.

Other advantages and novel features of the present light emitting diode illumination device will become more apparent from the following detailed description of preferred embodiments when taken in conjunction with the accompanying drawings, in which:

DETAILED DESCRIPTION

Figure 1:
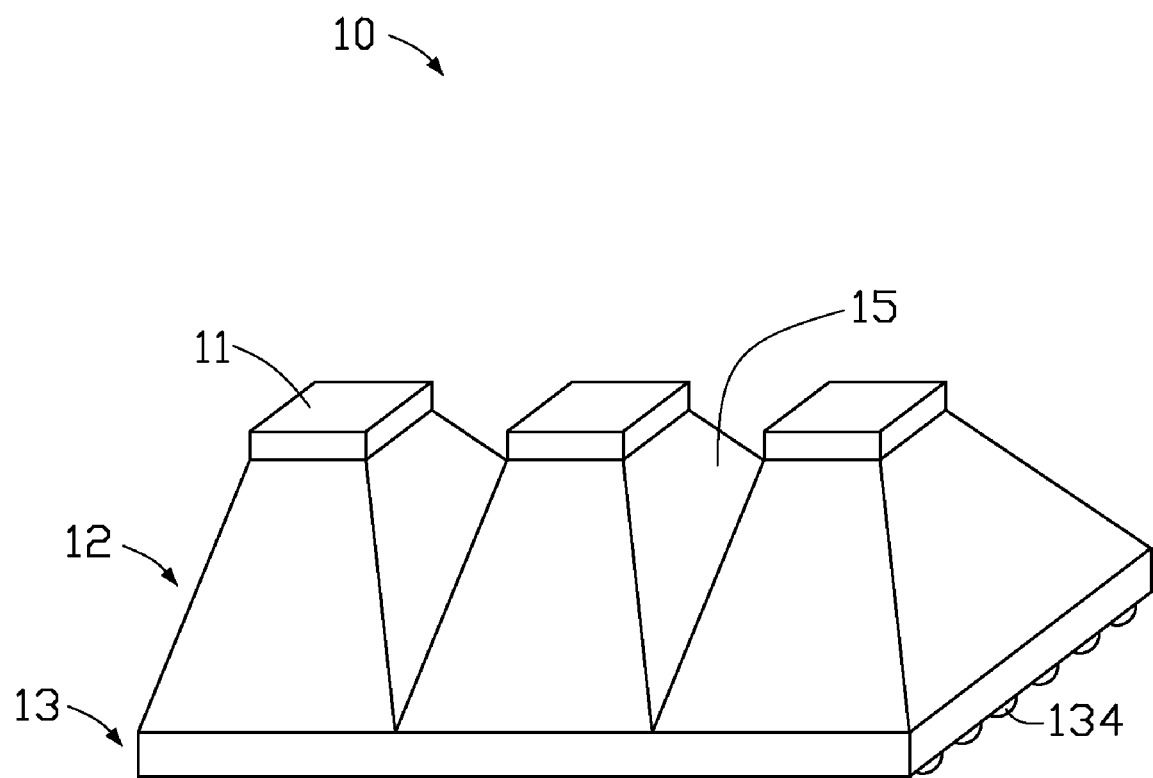
FIG. 1 is an isometric view of a light emitting diode illumination device in accordance with a preferred embodiment of the present invention.

Reference will now be made to the drawing figures to describe the preferred embodiment in detail.

Figure 2:
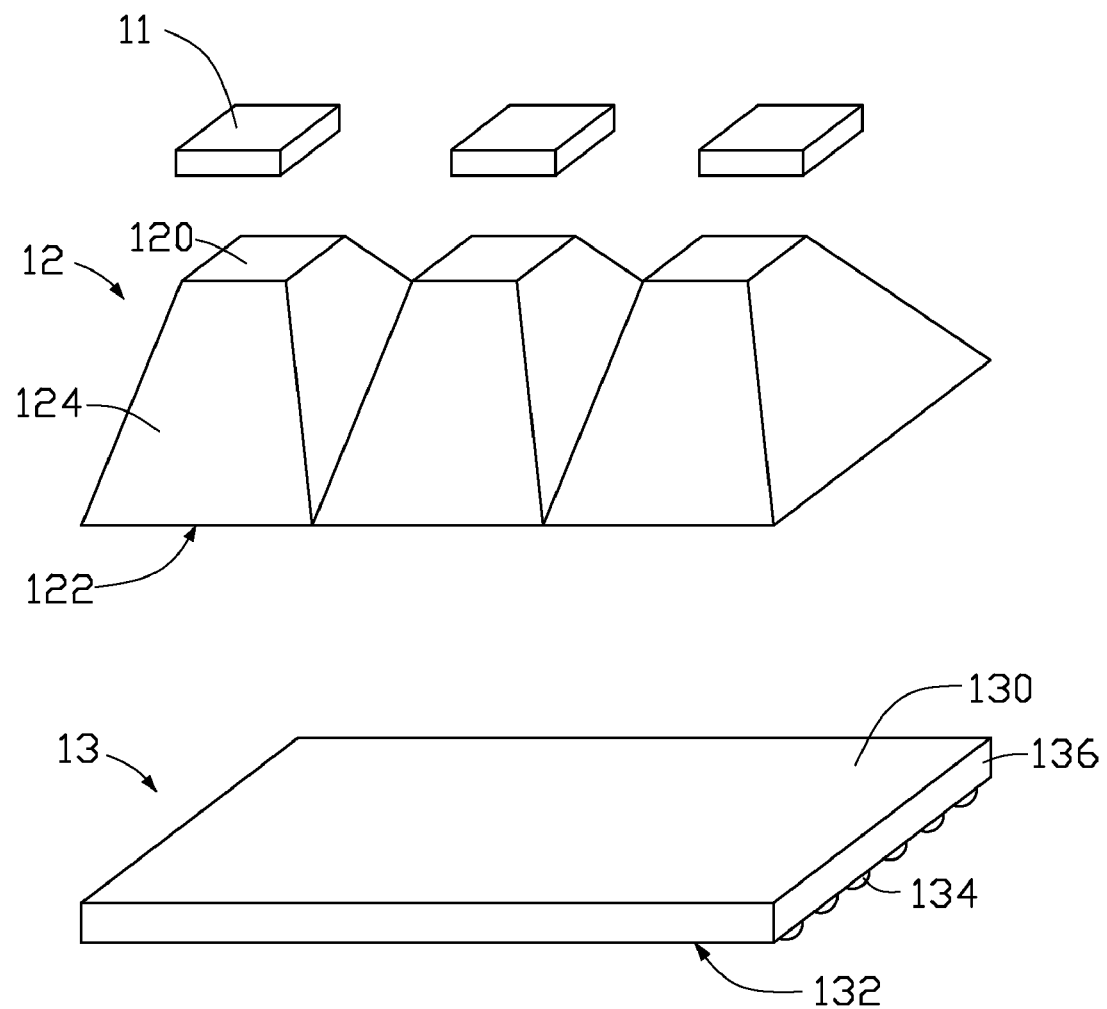
FIG. 2 is an exploded view of the light emitting diode illumination device of FIG. 1.

The present embodiment provides a light emitting diode illumination device which can attenuate the light intensity of light emitting diodes (LEDs) thereof and has a uniform light emission. Referring to FIGS. 1-2, the light emitting diode illumination device 10 includes three LEDs 11, three light guide members 12 and a light diffusing plate 13. The LEDs 11 are optically coupled to the light guide members 12, that is, each of the LEDs 11 is attached to a corresponding top surfaces of the light guide members 12. The light guide members 12 are juxtaposed with each other to form a common flat bottom surface attached to the light diffusing plate 13. The light guide members 12 have a saw-toothed outer configuration and a wedge-shaped interval 15 defined between neighboring light guide members 12.

Each LED 11 may include one or more LED chips, which may be selected from the group of GaN LED chip, InGaN LED chip, ALInGaP LED chip and so on, or any combination thereof. In the present embodiment, each LED 11 includes a GaN LED chip.

The light guide members 12 are configured to convert the LEDs 11 into a uniform surface light source. The light guide members 12 are transparent and each in shape of a frustum. Preferably, the frustum shape includes frustum of cone, frustum of pyramid, frustum of prism, frustum of sphere, and a shape with parabolic sidewalls extending between two spaced and parallel surfaces. Each light guide member 12 includes a light input surface 120, a light output surface 122 and at least one sidewall 124 connecting the light input surface 120 with the light output surface 122. The light input surface 120 is optically coupled to the LED 11 and receives light from the LED 11. Light emitted from the LED 11 propagates in the light guide member 12 and is reflected by the sidewall 124 until it reaches the light output surface 122, and then is emitted from the light output surface 122 towards the light diffusing plate 13.

In the present embodiment, each light guide member 12 is in shape of a rectangular pyramid, which includes a top surface, a bottom surface and a plurality of sidewalls extending from the top surface to the bottom surface. The top surface of the light guide member 12 serves as the light input surface 120 while the bottom surface of the light guide member 12 serves as the light output surface 122. Thus, the light input surface 120 of the light guide member 12 has a smaller surface area than the light output surface 122. In another embodiment, the sidewalls 124 may be selected to serve as a light input surface, and the light emitted from the LED 11 will be incident into the light guide member 12 from the selected sidewalls 124.

In the present embodiment, the sidewalls 124 of the light guide member 12 are constructed so that the light emitted from the LED 11 reached to the sidewalls 124 can be reflected back to the light output surface 122 of the light guide member 12. This helps to make good use of the light emitted from the LED 11.

Figure 3:
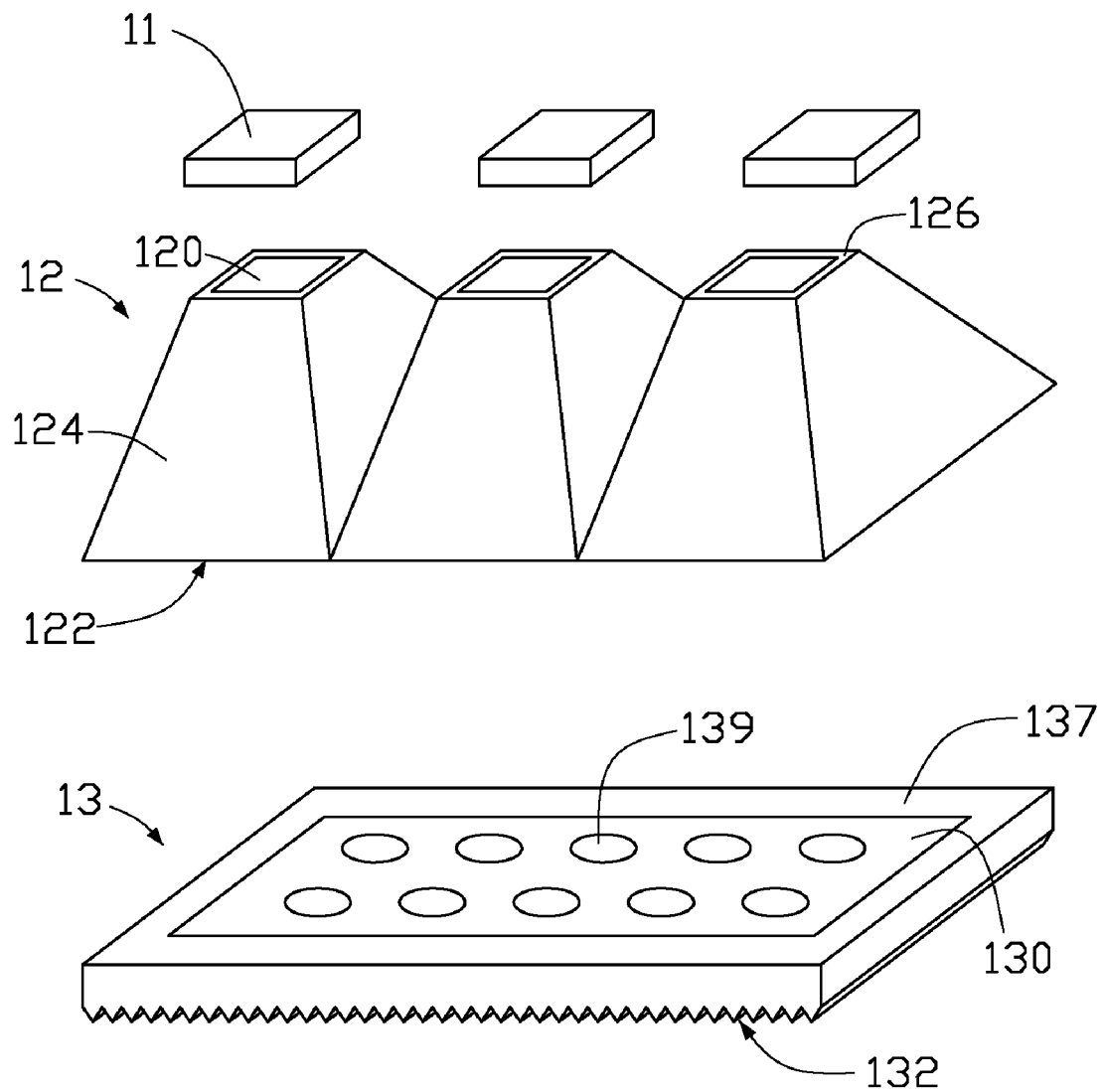
FIG. 3 is a view similar to FIG. 2 with several accessional elements added.

To make sure that all of the light reached to the sidewalls 124 can be reflected back to the light output surface 122 of the light guide member 12, a reflection layer 126 is applied on outer surfaces of the sidewalls 124 as shown in FIG. 3. The reflection layer 126 may be a film of silver, aluminum, reflective ink or the like.

The light diffusing plate 13 is configured to make light transmission uniform. The light diffusing plate 13 is a rectangular sheet and made of a transparent material. The suitable materials for the light diffusing plate 13 include polymethylmethacrylate, polycarbonate, epoxy resin, polyacrylate, silicone and glass. The light diffusing plate 13 includes a light incident surface 130, a light emission surface 132, a plurality of lateral surfaces 136 extending between the light incident surface 130 and the light emission surface 132, and a plurality of small protrusions 134 formed on the light emission surface 132. The light incident surface 130 and the light emission surface 132 are arranged on opposite sides of the light diffusing plate 13.

The light incident surface 130 is attached to the light output surface 122 of the light guide member 12. The light emitted from the LED 11 travels through the light guide member 12 and enters into the light diffusing plate 13 from the light incident surface 130, and is then emitted from the light emission surface 132.

When the light emits from the light emission surface 132, the light hits on the protrusions 134 and is refracted or reflected by the protrusions 134 so that the light is scattered. Therefore, the light intensity of the LED 11 is further attenuated and the light emitting diode illumination device 10 has a uniform light emission. Preferably, the protrusions 134 each may have a shape of half-sphere with a diameter no larger than 5 millimeters. Alternatively, other structures can be formed on the light emission surface 132 instead of the protrusions 134 to improve the uniformity of the illumination of the light diffusing plate 13.

Figure 4:
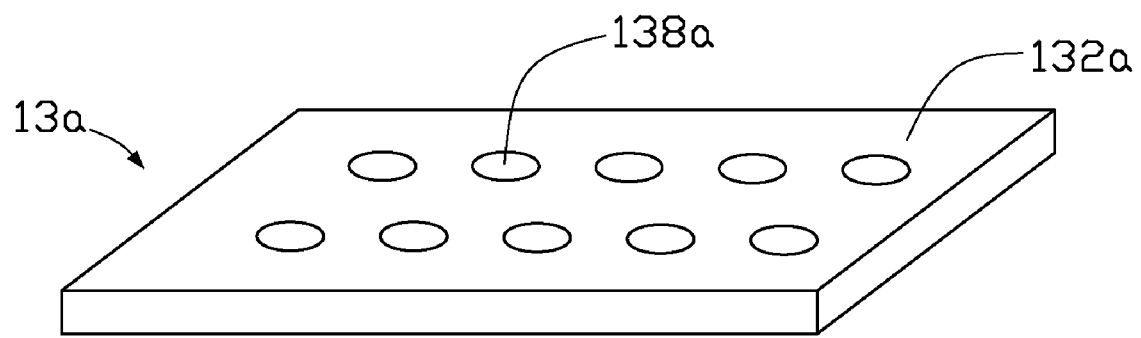
FIG. 4 is an isometric view of a light diffusing plate of a light emitting diode illumination device in accordance with another preferred embodiment of the present invention.

For example, as shown in FIG. 4, a light emission surface 132a of a light diffusing plate 13a may be formed with a plurality of dots 138a instead of the protrusions 134 via pressing or injection molding. As shown in FIG. 3, the light emission surface 132 may be manufactured into a rough fog surface via grinding or sand-blasting, or the light diffusing plate 13 may have a plurality of bubbles or material defects formed therein via exposing the light diffusing plate 13 to high energy density electromagnetic wave irradiation. Furthermore, as shown in FIG. 3, the light diffusing plate 13 may be filled with a plurality of particles 139, which have a refractive index different from that of the light diffusing plate 13. The suitable materials for the particles 139 include alumina, titanium oxide, silicon nitride, calcium fluoride, barium sulfate, zinc oxide, boric oxide, niobium oxide, sodium oxide, lithia, and any combination thereof.

The lateral surfaces 136 of the light diffusing plate 13 extend downwards from a periphery of the light incident surface 130. The lateral surfaces 136 of the light diffusing plate 13 have a reflection layer 137 formed thereon as shown in FIG. 3. The reflection layer 137 formed on the lateral surfaces 136 may be a film of silver, aluminum, reflective ink or the like. By the presence of the reflection layer 137, the light traveled to the lateral surfaces 136 is reflected back to the light emission surface 132. Thus, the light emitted from the light output surface 122 reaches the light emission surface 132 directly or through the reflection layer 137, and is then emitted from the light emission surface 132.

Figure 5:
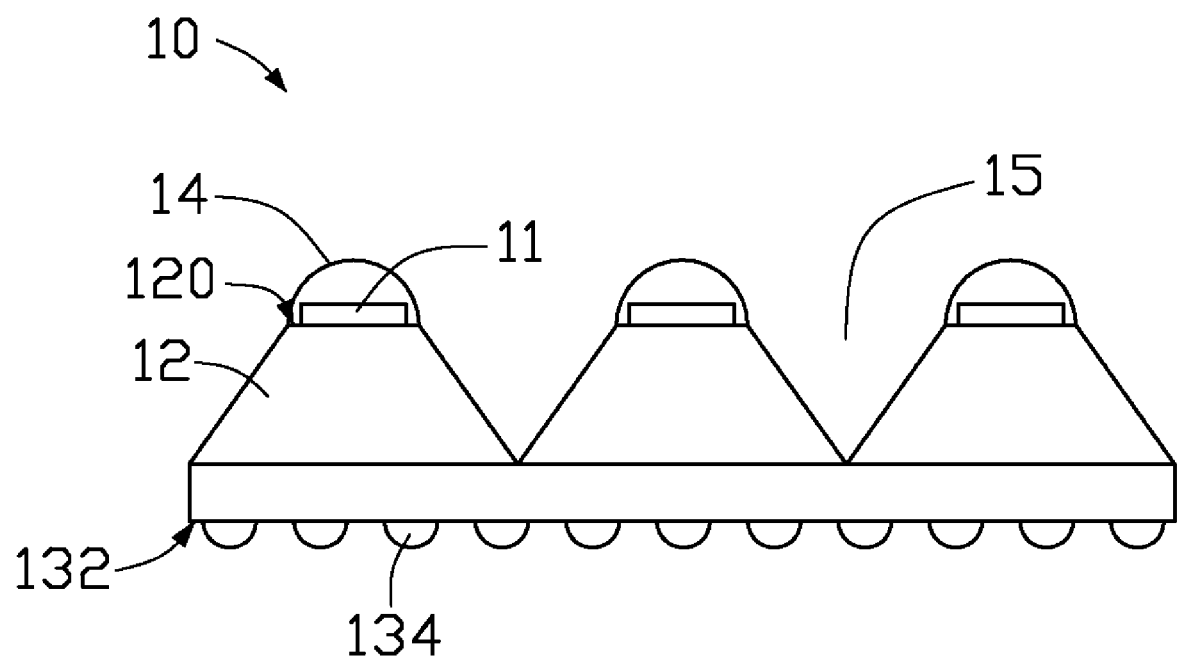
FIG. 5 is a side-elevation view of FIG. 1 together with reflectors mounted on light emitting diodes of FIG. 1.

As shown in FIG. 5, the light emitting diode illumination device 10 further includes three reflectors 14 each covering one of the LEDs 11. The reflectors 14 are attached to the light input surfaces 120 in such a manner that each of the LEDs 111 is enveloped between one corresponding light input surface 120 and one corresponding reflector 14. The light emitted from the LEDs 11 and traveled to the reflectors 14, is reflected back to the light input surfaces 122. This helps to make good use of the light from the LEDs 11. The shape of the reflectors 14 may be tapered, or spherical or ellipsoidal and so on.

Additionally, the light guide members 12 and the light diffusing plate 13 may be separately manufactured and then jointed together via conventional methods. It can be understood that the light guide members 12 and the light diffusing plate 13 may be manufactured from a single block of material, and this helps to make full use of the light from the LEDs 11.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light emitting diode (LED) illumination device comprising:
    an LED;
    a frustum-shaped light guide member having a light input surface and a light output surface opposite to the light input surface, the light guide member tapering from the light output surface to the light input surface, the light input surface optically coupled to the LED;
    a light diffusing plate optically coupled to the light output surface of the light guide member; and
    a plurality of particles each having a refractive index different from that of the light diffusing plate being filled in the light diffusing plate.

2. The light emitting diode illumination device of claim 1, wherein the frustum-shaped light guide member has a configuration selected from the group consisting of a frustum of cone, a frustum of pyramid, a frustum of prism, and a frustum of sphere.

3. The light emitting diode illumination device of claim 1, wherein the light guide member comprises a peripheral side surface extending from the light input surface to the light output surface, and a reflection layer is formed on the peripheral side surface.

4. The light emitting diode illumination device of claim 1, wherein the light diffusing plate comprises a light incident surface attached to the light output surface of the light guide member, a light emission surface opposite to the light incident surface and a plurality of lateral surfaces extending between the light incident surface and the light emission surface, and a reflection layer is formed on the lateral surfaces of the light diffusing plate.

5. The light emitting diode illumination device of claim 1, wherein the light diffusing plate comprises a light emission surface facing away from the light output surface of the light guide member, and the light emission surface is a fog surface.

6. The light emitting diode illumination device of claim 1, wherein the light diffusing plate comprises a light emission surface facing away from the light output surface of the light guide member, and the light emission surface has a plurality of protrusions or dots formed thereon to improve uniformity of illumination of the light diffusing plate.

7. The light emitting diode illumination device of claim 1, wherein the light guide member is integrally formed with the light diffusing plate, the light guide member and the light diffusing plate being comprised of a same material.

8. The light emitting diode illumination device of claim 1, wherein the particles are comprised of a material selected from the group consisting of include alumina, titanium oxide, silicon nitride, calcium fluoride, barium sulfate, zinc oxide, boric oxide, niobium oxide, sodium oxide, lithia, and any combination thereof.

9. The light emitting diode illumination device of claim 1, wherein the light diffusing plate has a plurality of bubbles or material defects embedded therein.

10. The light emitting diode illumination device of claim 1, further comprising a reflector covering the LED.

11. The light emitting diode illumination device of claim 10, wherein the reflector is attached to the light input surface in such a manner that the LED is enveloped between the light input surface and the reflector.

12. A light emitting diode (LED) illumination device comprising:

a plurality of LEDs;

a plurality of light guide members each having a light input surface, a light output surface, and a peripheral side surface interconnecting the light input surface and the light output surface, each of the light guide member tapering from the light output surface to the light input surface, wherein the LEDs are optically coupled to the light input surfaces respectively;

a light diffusing plate optically coupled to the light output surfaces of the light guide members; and a plurality of particles each having a refractive index different from that of the light diffusing plate being filled in the light diffusing plate.

13. The light emitting diode illumination device of claim 12, wherein the light guide members are juxtaposed with each other on the light diffusing plate, the light output surfaces of the light guide members share a common plane.

14. The light emitting diode illumination device of claim 12, wherein the light guide members are contiguous to each other and cooperatively form a saw-toothed configuration.

15. The light emitting diode illumination device of claim 12, wherein light diffusing plate comprises a light incident surface optically coupled to the light output surfaces, a light emission surface opposite to the light incident surface, and a peripheral side surface interconnecting between the light incident surface and the light emission surface, a reflection layer being provided on the entire peripheral side surfaces of the light guide members and the light diffusing plate.

* * * * *